United States Patent [19]

Brown et al.

[11] 4,235,753

[45] Nov. 25, 1980

[54] ZEOLITIZED COMPOSITE BODIES AND MANUFACTURE THEREOF

[75] Inventors: Stanley M. Brown, Scotch Plains; Gerald M. Woltermann, Middletown, both of N.J.

[73] Assignee: Engelhard Minerals & Chemicals Corporation, Menlo Park, N.J.

[21] Appl. No.: 21,214

[22] Filed: Mar. 16, 1979

[51] Int. Cl.³ .............................................. B01J 29/06
[52] U.S. Cl. ................................. 252/455 Z; 423/328
[58] Field of Search ...................... 252/455 Z; 423/328

[56] References Cited

U.S. PATENT DOCUMENTS

| | | | |
|---|---|---|---|
| 3,663,165 | 5/1972 | Haden, Jr. et al. | 423/328 X |
| 3,671,191 | 6/1972 | Maher et al. | 423/328 |

Primary Examiner—Carl F. Dees
Attorney, Agent, or Firm—Inez L. Moselle

[57] ABSTRACT

An improved process for the production of mechanically strong shaped crystalline zeolitic aluminosilicate bodies from precursor bodies composed of kaolin clay calcined at elevated temperature, the crystallized bodies having essentially the same size and shape as the precursor bodies. Conversion of the calcined clay contained in the precursor bodies to a mixture of crystalline zeolitic alluminosilicate component and a porous amorphous silica-alumina component takes place as a result of reaction between the calcined clay and an aqueous alkaline liquid in which the bodies are immersed. The improved process features the presence of a solution of aluminosilicate nucleation centers during such reaction.

14 Claims, No Drawings

ZEOLITIZED COMPOSITE BODIES AND MANUFACTURE THEREOF

BACKGROUND OF THE INVENTION

The invention relates to improvements in the manufacture of composites of crystalline aluminosilicate zeolite and amorphous alumina-silica in the form of mechanically strong monolithic bodies. The invention relates particularly to an improvement in those processes for producing such composites which involve the in situ synthesis of a zeolite alumino-silicate, such as faujasite, ZSM-5 or mordenite, by reaction of a solution of a base with calcined clay contained in preformed self-supporting monolithic bodies.

Zeolitic molecular sieves are used in a wide variety of catalytic and adsorptive applications. For example, sieves such as faujasites and ZSM-5 are well-known constituents of hydrocarbon conversion catalysts. Other synthetic zeolites such as mordenite are useful as catalysts for the reduction of nitrogen oxides with ammonia. The zeolites are normally synthesized as finely divided high purity crystals. For most purposes the crystals must be bonded with a suitable matrix material such as a silica-alumina gel, clay or mixture thereof, to form particles having good attrition resistance, high heat capacity and thermal conductivity. The choice of a binder for a zeolitic molecular sieve is limited by the fact that the binder must be thermally stable and provide access of gases or liquids to the zeolite crystals in the composite particles.

Zeolitic molecular sieve catalyst or catalyst support particles are supplied in the form of small microspheres, typically particles having an average size of about 60 microns, when they are to be used in fluidized bed processing such as fluidized bed catalytic cracking of gas-oil feedstocks. Generally the particles are in the form of cylinders or spheres that are 1/16 inch or larger when they are to be used in fixed bed processes such as the hydrocracking or hydrotreating of resid hydrocarbons. On the other hand, gas phase reactions carried out at high space velocity and liquid phase reactions of heavy oils are often diffusion limited, i.e., only the outer portion of the catalyst particles is utilized. Catalysts for such reactions are desirable in the form of thin-walled honeycombs. Irrespective of the specific form or shape of the catalyst or absorbent bodies, it is generally desirable to provide the structures in the form of rigid, attrition-resistant bodies in which zeolite crystals are uniformly disseminated in a porous heat-stable matrix.

The synthesis of zeolites from calcined clays, especially kaolin clay, is known. For example, it is well known that metakaolin (kaolin clay calcined at a temperature of about 1200° to 1500° F.) will react with sodium hydroxide solution to produce sodium zeolite A. It is also known that when kaolin is calcined under more severe conditions, sufficient to undergo the characteristic exothermic reaction, for example 1700° to 2000° F., the calcined clay will react with sodium hydroxide solution, small amounts of metakaolin preferably being present, to synthesize faujasite-type zeolites. Reference is made to the following commonly assigned patents of Haden et al: U.S. Pat. Nos. 3,335,098 and 3,338,672. As an offshoot of these discoveries processes were invented that resulted in shaped bodies that were composites of a mixture of crystals of faujasite-type zeolites and porous silica-alumina matrix. The composites were synthesized directly in the form of shaped particles, in particular fluidizable microspheres, from preforms composed of kaolin clay calcined to undergo the exotherm. This was accomplished by immersing the preforms (microspheres of kaolin clay calcined at high temperature) in a solution of sodium hydroxide to form a slurry, aging the slurry, typically for 4–8 hours at 100° F. and then heating to crystallize the zeolite within the preforms. Silica originally in the microspheres was leached or extracted during the reaction, producing a sodium silicate mother liquor and leaving a porous matrix in the zeolitized microspheres. Because the composite bodies were zeolitized directly without a separate binding step to composite zeolite and binder, the processing has become known as the "in situ" process. Reference is made to the following commonly assigned patents of Haden et al: U.S. Pat. Nos. 3,391,994, 3,433,587, 3,503,900 3,506,594, 3,647,718 and 3,663,165 and 3,932,268.

It is now known that the in situ technology can be utilized to convert bodies of kaolin clay calcined to undergo the exotherm into composite bodies in which the zeolitic component is other than a member of the faujasite family. For example, the crystalline aluminosilicate component can be synthetic crystalline mordenite or ZSM-5 type zeolites. Reference is made to U.S. Pat. No. 4,091,007 to Dwyer et al and to our copending U.S. application Ser. No. 864,731 dated Dec. 27, 1977 and now abandoned, the entire disclosures of which are incorporated herein by cross-reference. Further, it has also been discovered that calcined clay-containing precursor bodies and ultimate zeolitized products can take forms other than fluidizable microspheres. For example, the bodies may be cylindrical pellets, berl saddles or they may even have complex intricate shapes such as multi-channeled structures or honeycombs. Reference is made to our copending application Ser. No. 856,658 filed Dec. 2, 1977 and now abandoned, the entire disclosure of which is also incorporated herein by cross-reference and to U.S. Pat. No. 4,091,007 (supra).

Irrespective of the zeolite to be synthesized by in situ reaction between preformed bodies composed of kaolin clay calcined to undergo the exotherm and basic solutions, the source of clay and the calcining conditions have a significant effect on the process. Calcination of hydrated kaolin clay results in dramatic changes in the reactivity of the clay towards both bases and acids. Especially when the clay is calcined at temperature sufficiently high to undergo the exotherm, the reactivity of the calcined clay is remarkably sensitive to the source of the hydrated clay employed as a starting material and reactivity is also highly sensitive to calcination conditions. For reasons not presently understood even high purity kaolin clays from different sources frequently react differently towards acids and bases when calcined under essentially the same conditions and in the same equipment. The difference in reactivity towards basic solutions is reflected in rate of reaction and/or by the composition and quantity of the crystalline zeolitic aluminosilicate present in the zeolitized bodies. This can present quality control problems of considerable magnitude. For example, in the manufacture of a faujasite cracking catalyst it is generally desirable to synthesize a faujasite component having a consistently high $SiO_2/Al_2O_3$ and in a consistent quantity. In practice this means that when the manufacturer of a cracking catalyst utilizing the in situ approach employs a new source of clay, an undesirably low zeolite content may be found in the zeolitized bodies or the $SiO_2Al_2O_3$ of the zeolite component may be less than desired. This may also occur when there are fluctuations in the operation of the calciner.

Sensitivity of the in situ processing to variations in clay and calcination conditions is minimized to a certain extent by including a small amount of the form of calcined clay generally referred to as "metakaolin" in the reaction mixture. As noted in several of the patents cited above, metakaolin is prepared under conditions that are relatively mild compared to those employed when the clay undergoes the exotherm. While the addition of metakaolin has the effect of "smoothing out" the process, it does not assure that the desired zeolite content and zeolite composition will be achieved under any conditions, much less at an acceptable production rate, irrespective of the clay source and the conditions employed when the green clay bodies are calcined to undergo the exotherm.

Practice of present invention incorporates the feature of carrying out the reaction between the shaped precursor bodies of calcined clay and aqueous reaction liquid in the presence of added nucleation centers, i.e., a dilute aluminosilicate solution, generally of a colloidal nature, and chemically akin to the crystalline zeolite that is to be synthesized. Such nucleation centers, frequently referred to as "seeds" or crystallization "directors", have been used in a wide variety of crystallization operations. These have included processes for preparing zeolitic aluminosilicates of the synthetic faujasite type. In accordance with the teachings of U.S. Pat. No. 3,808,326 nucleation centers are used in the synthesis of so-called zeolite Y (U.S. Pat. No. 3,130,007) from active $SiO_2/Al_2O_3$ gels. As a result, inception time and reaction rate are reduced. Solutions of nucleation centers are also used in the process of U.S. Pat. No. 3,671,191 but they are employed with a mineral acid to prevent silica solubilization by excess caustic, the acid thus allowing growth of higher $SiO_2/Al_2O_3$ faujasite. Without the nucleation centers, too long a reaction time would result. Crystalline nucleation centers are utilized in practice of the invention of U.S. Pat. No. 3,574,538. This is in contrast to the amorphous nucleation centers employed in the processes of the above patents. U.S. Pat. No. 3,547,538 teaches that heat accelerates maturation of nucleation centers. Again, the nucleation centers are employed simply to increase reaction rate of faujasite-type zeolites. U.S. Pat. No. 3,492,090 also concerns a seeded reaction for production of synthetic crystalline zeolites of the faujasite type. The feature of this patent is that after addition of nucleation centers and silica-alumina gel the mixture is deliquored and the solid cake is reacted at 200° F. Reduction in material handling is cited as the advantage. In U.S. Pat. No. 3,777,006 metakaolin is mixed with sodium silicate to correct for differences in $SiO_2/Al_2O_3$ between the clay and the desired crystalline zeolite Y reaction product. The mixture is formed into particles, dried for 16-24 hours to impart hardness, and then reacted with caustic and a solution of nucleation centers to produce particles composed essentially or substantially so, of zeolite Y. British Pat. Nos. 1,271,450 and 1,342,977 deal with processes generally similar to the one described in U.S. Pat. No. 3,777,006. In the processes of the British patents, the metakaolin and sodium silicate (or silica-alumina gel) are formed into small fluidizable spheres by spray drying slurries of the mixtures. In the former patent (U.S. Pat. No. 1,271,450), the zeolitic nucleation centers are included in the slurry feed to the spray drier and the spray dried product is reacted with caustic to form zeolite. In the latter patent (U.S. Pat. No. 1,342,977), the seeds are added after spray drying to the caustic reaction slurry. The method allegedly allows formation of harder particles, since the particles can be calcined after spray drying without fear of affecting seed integrity.

THE INVENTION

The present invention comprises the in situ synthesis of a zeolitic aluminosilicate molecular sieve within a preformed calcined kaolin clay shaped body or bodies by reacting the preformed body or bodies with an aqueous solution of a base to effect the synthesis, the reaction being carried out in the presence of a solution of zeolitic nucleation centers of colloidal dimension. During the synthesis, substantial silica and/or alumina is leached from the preformed body or bodies by the basic solution. This results in adequate diffusion during synthesis and then imparts desirable porosity in the amorphous alumina-silica component of the finished molecular sieve crystal containing body. Leaching of silica and/or alumina provides diffusion paths in the bodies to and from the zeolitic molecular sieve crystals disseminated therein.

In a presently preferred embodiment the invention comprises a process in which nucleation centers are added to a mixture of microspheres of kaolin clay that have been calcined at elevated temperature to undergo the characteristic exotherm and caustic solution. The seeds increase growth rate, desensitize the growth rate dependence on microsphere quality and provide a simple means to consistently produce fluid cracking catalyst particles having a desired high $SiO_2/Al_2O_3$ ratio zeolite. In fact, practice of an especially preferred embodiment results in novel composite cracking catalysts having $SiO_2/Al_2O_3$ considerably higher than those obtained by prior art in situ processing.

Practice of the present invention represents a significant departure from the practice of prior art crystallization processes using seeds. Processing problems unique to the production of composite zeolitic bodies from precursor bodies composed of high temperature calcined clay were not faced by prior art workers who did not use such form of clay and were not concerned with sensitivity of zeolite crystallization to source of clay and calcination history. By practice of the invention these unique problems are overcome or at least minimized. Furthermore, the invention provides means for the manufacture of a variety of composite synthetic crystalline zeolitic bodies not capable of being produced on a consistent production scale basis by prior art "in situ" zeolite composite synthesis, as described above.

In general, the difference between prior art and the present invention lies in the fact that the use of seeds and subsequent reaction chemistry are tailored to the unique characteristics of in situ processing of bodies composed of clay calcined to undergo the exotherm. Use of seeds in accordance with this invention provides ease of processing, higher $SiO_2/Al_2O_3$ ratios than often result when seeds are not used, and, remarkably, desensitization to microsphere calcination and clay source. Use of seeds in the prior literature was to accelerate formation of zeolite and not to provide ability to use reagents of varying quality or to improve product quality. Therefore the advantages found with the use of seeds in in situ processes were not expected or predictable based on prior art. In fact, those knowledgeable in theoretical concepts relative to the mechanisms by which seeds accelerate crystallization will find it unexpected that seeds have any effect much less a significant effect, on crystals forming within rigid coherent bodies that have a substantial mass compared to that of individual crystals that are eventually generated with such bodies.

In contrast with the process of the invention, the sole advantage of using seeds in carrying out the technology described in U.S. Pat. No. 3,808,326 (supra) is to reduce crystallization time. Similarly, the instant invention is basically different from practices described in U.S. Pat. Nos. 3,671,191 and 3,574,538. These patents also deal with seeded reactions involving silica alumina gels and not preformed calcined kaolin bodies such as microspheres. As for U.S. Pat. No. 3,574,538, seeds are used to increase reaction rate and bodies of kaolin calcined at high temperature (e.g. 1800° F.) are not employed. Microcrystals, as required in practice of the invention of U.S. Pat. No. 3,574,538, would be unsuitable in the process of the present invention because of the size of the precursor reaction bodies and the chemistry involved. The principles of U.S. Pat. No. 3,492,090, would obviously be inapplicable to the present invention. In contrast to the teachings of U.S. Pat. No. 3,777,006 in which metakaolin and sodium silicate are reacted in a seeded environment to produce pure zeolite Y, our process uses high temperature calcined microspheres which furnish the silica and alumina reactants and which are converted only partially (e.g., 10 to 30%) to faujasite. Referring now to British Pat. Nos. 1,271,450 and 1,342,977 in which metakaolin and seeds are used in a process including a spray drying step, it is apparent that even when carrying out that presently preferred embodiment of the present invention in which a faujasite catalyst is prepared by spray drying clay, calcining the resulting spray dried microspheres and reacting the calcined clay in microsphere form with sodium hydroxide in a seeded environment, results and benefits not possible by the teachings of the British patents are achieved.

DESCRIPTION OF PREFERRED EMBODIMENT

The principles of this invention and practice thereof are applicable in general to any process for converting a preformed body or bodies composed of high temperature calcined kaolin into a body or bodies composed of a mixture of crystals of at least one crystalline zeolitic aluminosilicate uniformly disseminated throughout one or more porous non-zeolitic silica/alumina phases, which process involves immersing the preformed body or bodies in a solution of one or more bases, optionally aging, and heating the mixture until zeolite crystals are formed in the bodies. By way of example, the base may be sodium hydroxide solution or mixed sodium hydroxide—quarternary ammonium bases, depending on the crystalline zeolite that is desired. Concentration of the base and proportion of basic oxide, e.g., $Na_2O$, in the solution relative to $SiO_2$ and $Al_2O_3$ in the calcined bodies, also influences the composition and quantity of zeolitic aluminosilicate. Such processes are described in the Haden et al patents and the Dwyer et al patent cited above, and in the pending applications, the teachings of which have been incorporated herein by cross-reference.

The zeolitic nucleation centers used in carrying out our invention are colloidal zeolitic precursors grown from mixed sodium aluminate-sodium silicate solutions. Suitable solutions of nucleation centers are described in U.S. Pat. Nos. 3,803,326, 3,777,006, 3,574,538, 3,886,094 and 3,671,191. Generally the solutions useful when the preforms are zeolitized to contain a molecular sieve of the faujasite family will contain 90–92 mole % water and are tightly bunched at the center of the high $SiO_2$/$Al_2O_3$ faujasite phase field for zeolite growth from gels. When mordenite is desired the composition will be appropriately enriched in silica to correspond to the composition of synthetic mordenite. In most cases, solutions of zeolitic nucleation centers are grown (aged) at or below room temperature and are maintained at a temperature below about 100° F., preferably below about 90° F., and most preferably at about 60° F. to 75° F. to avoid gelation before being added to the mixture of preformed bodies and solution of base. Presently preferred are solutions of nucleation centers in which the sub-micron size particles of sodium aluminosilicates are amorphous (to X-ray). Satisfactory solutions have been prepared by the following methods:

(1) Twenty-six (26) g. of $Al_2O_3.3H_2O$ were dissolved at 180° F. in a solution of 158 g. of NaOH in 558 ml. of water. The solution was cooled to 60° F. and 555 g. of N ®-brand sodium silicate (8.9% $Na_2O$, 28.8% $SiO_2$, 62.3% $H_2O$) was slowly added. Reaction temperature did not exceed 70° F. The mixture was aged in a sealed container overnight at ambient temperatures of about 70°–75° F. before being used as nucleation centers.

(2) Twenty-six (26) g. of $Al_2O_3.3H_2O$ was dissolved in a solution of 100 g. of NaOH in 455 ml. of water. This solution was cooled to 60° F. and 400 g. of a sodium disilicate solution (28.8% $SiO_2$, 8.9% $Na_2O$ and balance $H_2O$) was slowly added. The system was then allowed to sit 3–4 hours before use.

(3) Ten and eight-tenths (10.8) g. of $Al_2O_3.3H_2O$ was dissolved in a solution of 32 g. of NaOH in 200 ml. of water. This solution was cooled to 100° F. and added to a resin flask containing 167 g. of a sodium disilicate solution (28.8% $SiO_2$, 15% $Na_2O$, and balance $H_2O$). The system was stirred 10 minutes and the mixture was then allowed to sit 3–4 hours at ambient temperatures before use.

A difference between typical prior art seeded zeolite synthesis from gels and use of nucleation centers in the present invention is that the in situ processes to which the invention is applicable usually require from 10–100% more nucleation centers for them to be effective than when nucleation centers are used in conventional manner to accelerate formation of discrete zeolitic crystals from gels. The reason is not known.

Irrespective of the specific size and shape of the zeolitized bodies or technique that is employed to place hydrated kaolin feed into the form of self-supporting green shaped bodies consisting of hydrated kaolin clay, the green bodies are calcined, preferably at 1700° to 2000° F., for a time sufficient to dehydrate the clay. During heat treatment the hydrated kaolin clay undergoes the characteristic kaolin endotherm associated with dehydration when it is heated to a temperature of about 1350° F. Subsequently the resulting metakaolin undergoes the characteristic exothermic reaction when it is heated to a temperature of about 1800° F. It is essential to calcine the preformed bodies at a temperature of 1700° F. or above in order to convert them to a state or condition such that they are useful in the synthesis of a catalytically suitable zeolite such as faujasite, mordenite or ZSM-5. Lower temperatures such as 1350° F. will generally limit zeolite synthesis to the formation of zeolites such as type A (U.S. Pat. No.

3,883,243) unless an additional source of silica, for example sodium silicate, is employed as a reactant. Furthermore, temperatures of 1700° F. or above lead to the formation of zeolitized bodies that will be considerably stronger than those obtainable at lower temperatures, e.g., 1350° F. On the other hand, temperatures appreciably above 2000° F. result in recrystallization of silica and/or alumina phases which generally are deleterious to the reactivity of the components in the precursor bodies with basic solutions. Thus the calcined preforms are preferably amorphous or essentially so when tested by a conventional X-ray diffraction technique (see the Haden et al patents supra).

Bases known to be useful in zeolite synthesis, including alkali metal hydroxides, ammonium bases, as well as mixtures thereof, may be employed in practice of the invention. The base or mixture of bases are dissolved in water and the solution added in amount at least sufficient to cover the preformed bodies to be zeolitized. Depending on the zeolite to be synthesized, soluble sources of silica and/or alumina may be added to the aqueous reaction medium. Generally aqueous solutions of 2 to 30% weight concentration are used. The amount of solution, controlled to provide the desired ratios of alkali (and/or ammonium oxide) to $Al_2O_3.2SiO_2$ in the calcined preformed bodies, will obviously vary with the zeolite that is to be synthesized within the bodies and with the concentration of the solution of the base.

Generally the reactions are carried out at atmospheric or elevated pressure at elevated temperature for a time sufficient to achieve crystal formation within the preformed bodies. In the case of faujasite synthesis, a lower temperature (aging step) may precede the high temperature crystallization. The zeolite is crystallized in hydrated form.

The desired quantity of the zeolite component in the crystallized bodies will vary with intended end use. When used as cracking catalysts the zeolitized bodies will contain about 2 to 75%, most preferably 10–50%, crystalline zeolite as determined by X-ray diffraction. It should be noted that complete conversion of the bodies to zeolite is avoided since the structures may lack mechanical strength and diffusivity imparted by the porous nonzeolitic alumina-silica matrix constituent.

After synthesis the bodies may be subjected to ion exchange treatment in known manner to replace cations present as a result of synthesis with more desirable cations. For example, exchangeable sodium may be reduced to 1% or below by ion exchange with ammonium salts, ammonium and rare earth salts or alkaline earth metal salts.

In some cases, the crystallized bodies, which may have undergone ion exchange, are used as a support for a catalytically active metal or metal compound, for example platinum, which may be incorporated by ion exchange, impregnation or a combination thereof.

The presently preferred embodiment of the invention is directed to improving the manufacture of cracking catalyst particles in the form of fluidizable small (microspheres) from precursor bodies prepared by spray drying an aqueous slurry of hydrated kaolin clay to form microspheres, and calcining the microspheres at temperature and for a time sufficient for the hydrated kaolin to dehydroxylate and then undergo at least partially the characteristic exotherm. The microspheres are formed into a slurry by mixing them with sodium hydroxide solution generally of 15% to 20% weight concentration, the solution containing from about 0.45 to 0.75 moles $Na_2O$ per mole $Al_2O_3$ in the microspheres. The $SiO_2/Al_2O_3$ molar ratio of the microspheres will depend on the source of clay and is generally about 2/1, corresponding to the theoretical $SiO_2/Al_2O_3$ of minerals of the kaolin clay family (kaolinite, halloysite, dickite, etc.). Optionally metakaolin is present in the slurry.

It is preferable to add seed solution, described below, to a performed slurry containing components required for zeolite crystallization in the microspheres although the seed solution may be added before this is done. The components of the slurry including the seeds may be aged, for example held at about 100° F. for 4 to 12 hours, but this is optional when practicing the invention. Whether or not an aging step is included in the process, the seeded slurry is heated until a desired amount, usually at least 5%, preferably at least 15%, and most preferably at least 20% zeolite of the faujasite family is crystallized. Generally the reactants are selected to synthesize a faujasite having a $SiO_2/Al_2O_3$ of at least 4.0, preferably at least 4.5 and most preferably 5 or above. (Zeolite content is estimated in conventional manner from X-ray patterns and $SiO_2/Al_2O_3$ is determined from the patterns using the known Freeman et al curve). Suitable temperatures for the heat treatment are described in the Haden et al patent. Mother liquor (sodium silicate solution) is removed at least partially from the microspheres, which are then ion-exchanged to reduce $Na_2O$ to about 1% or below, preferably below. Ammonium ions, mixed rare earth-ammonium ions, or rare earth ions are recommended for the ion-exchange(s).

Since the zeolitized bodies prepared by the in situ method are remarkably attrition-resistant, as emphasized above, the zeolite and nonzeolitic component(s) of such bodies cannot be separated from each other by known techniques. Therefore the precise chemical composition of the crystalline zeolitic component cannot be determined by conventional analytical techniques. However, the general structure of the crystalline component may be determined from X-ray patterns. By correlating information obtained from the pattern with published values obtained for X-ray patterns of pure zeolitic aluminosilicates with chemical composition of the corresponding pure zeolites, chemical analysis of the zeolite, e.g., $SiO_2/Al_2O_3$ may be estimated. Therefore, it will be understood that all values of $SiO_2/Al_2O_3$ and percent zeolite referred to herein are values obtained by interpretation of X-ray diffraction patterns as described in the Haden et al patents (supra).

The following examples are given to illustrate various forms of the presently preferred embodiment of our invention and to show certain advantages. The examples, all dealing with conversion of calcined kaolin clay microspheres to produce composite faujasite-containing fluid cracking catalyst particles, are not to be construed as limiting the invention to the specific reactants and reaction conditions since our invention has broader utility, as indicated above. For example, seeds may be used to grow mordenite or ZMS-5 type zeolites from preforms of high temperature calcined clay, the preforms being in the form of microspheres, cylindrical pellets or even honeycombs.

In the examples, the term "MK" refers to microspheres obtained by spray drying hydrated kaolin clay of high purity and calcining the resulting microspheres in air under conditions of time and temperature to convert the clay into metakaolin. The term "HTM" refers to microspheres calcined in air for a time and temperature to cause the kaolin to undergo the exotherm without mullite formation. Reference is made to the Haden et al patents (supra).

EXAMPLE I

This example shows the effects of variations of clay source and calcination conditions on crystallization of zeolite in preformed microspheres of calcined clay. The following example (Example II) demonstrates how seeds compensate for such variations.

Microspheres for the crystallization reaction were prepared by calcining portions of a sample of "MK" microsphere at 1800° F. in air for 2½ hours to convert them to "HTM." The "MK" microspheres were obtained from a low iron Georgia kaolin clay of the type known to produce high quality faujasite-containing cracking catalysts by the in situ method and normally used to prepare such catalysts. It is known that calcination of "MK" at 1800° F. will result in a different amount of zeolite and a zeolite of different apparent $SiO_2/Al_2O_3$ (X-ray analysis) than will be realized if calcination is at 1875° F. and all reaction conditions are otherwise maintained constant. However, fluctuations during calcination in a commercial plant can result in local overheating of part of the clay charge or even overheating of the entire charge and thus result in undesired overcalcination.

The procedure was repeated with calcined microspheres made from Georgia gray clay (an ultrafine particle size high iron content kaolin). Experience has shown that this particular clay is not a suitable source of clay for the in situ process. The microspheres of gray clay were calcined at 1800° F. for 2½ hours under conditions identical to those utilized in the calcination of the other microspheres.

Four hundred and seventy five of each of the above microspheres and 25 g. of "MK" were charged to three 500 ml. resin flasks along with 600 ml. of deionized water and 122.5 g. of caustic (17% NaOH solution). The slurries were aged for 6 hours at 100° F., and crystallized at 180° F. After crystallization the sodium silicate mother liquor was drained from the crystallized microspheres and the microspheres were washed and dried. The objective was to convert the microspheres to a product containing 25% zeolite having a $SiO_2/Al_2O_3$ of at least 4.5, as determined by X-ray analysis using the Freeman et al curve. Results are given in Table I.

TABLE I

EFFECT OF CLAY SOURCE & CALCINATION CONDITIONS ON ZEOLITE FORMATION - UNSEEDED REACTIONS

| Clay | Microsphere Calcination Temperature | Aging Time Hrs at 100° F. | Crystallization Time, Hrs at 180° F. | Relative % Zeolite (X-ray) | Zeolite $SiO_2/Al_2O_3$ (X-ray)* |
|---|---|---|---|---|---|
| (A) Normal Kaolin | 1800° F. | 6 | 17 | 21 | 4.3 |
| (B) Normal Kaolin | 1875° F. | 6 | 40 | 5 | — |
| (C) Gray Clay | 1800° F. | 6 | 40 | 8 | — |

*Freeman et al curve.

Data in Table I shows that only when the normal source of clay was used and calcination was at 1800° F. (A) did the desired quantity of zeolite form with less than 25 hours aging and crystallization time. When the normal source of clay was used but the microspheres were overcalcined (B) and when (C) was employed and the microspheres were calcined at 1800° F. reaction rates were poor and the quantity of zeolite formed was unacceptable.

EXAMPLE II

Microspheres prepared as above were then reacted using seeds. This was accomplished by adding 380 g. of the calcined (A, B or C) microspheres and 20 g. "MK" microspheres to a solution consisting of 300 ml. of deionized water, 64 g. of NaOH, and 400 gm. of a seed solution prepared according to recipe 2. The slurry was crystallized at 180° F. without being aged. Results are given in Table II.

TABLE II

EFFECT OF CLAY SOURCE & CALCINATION CONDITIONS ON ZEOLITE FORMATION- UNSEEDED REACTIONS

| Clay | Microsphere Calcination Temperature | Aging Time Hrs at 100° F. | Crystallization Time, Hrs at 180° F. | Relative % Zeolite (X-ray) | Zeolite $SiO_2/Al_2O_3$ (X-ray)* |
|---|---|---|---|---|---|
| Normal Kaolin | 1800° F. | 0 | 9 | 25 | 4.70 |
| Normal Kaolin | 1875° F. | 0 | 10 | 25 | 4.71 |
| Gray Clay | 1800° F. | 0 | 10 | 23 | 4.69 |

*Freeman et al curve.

A comparison of data in Tables I and II clearly show that use of seed solution greatly improved reaction consistency and product quality despite variations in microsphere clay and calcination temperature. Since the reasons certain clays tend to be less reactive and kaolin must be calcined within a certain temperature range in order to crystallize at least 20% faujasite-zeolite are not known, the positive effect of seeds in overcoming this limitation cannot be explained. While initiation of zeolite formation was facilitated by seeds, the reactants required for the formation of the zeolite came from the calcined clay microspheres as well as the seed slurry.

EXAMPLE III

This example illustrates the preparation of a sodium-form intermediate of a cracking catalyst with a high content of a faujasite type zeolite having a high $SiO_2/Al_2O_3$.

To a resin flask containing seed solution prepared according to seed recipe 3, was added 380 g. "HTM," 20 g. "MK," 300 ml. of water, and 60 g. of NaOH. The mixture was stirred and heated at 180° F. for sixteen hours. The microspheres were collected by suction filtration, washed and analyzed. X-ray analysis showed the product to contain 30% faujasite zeolite with a $SiO_2/Al_2O_3$ ratio of 5.02 (Freeman et al curve).

EXAMPLE IV

This example illustrates an especially preferred manner of practicing the invention in which a sodium-form intermediate of a fluid cracking catalyst containing about 20% faujasite-type zeolite having an exceptionally high $SiO_2/Al_2O_3$ was prepared.

A solution of nucleation centers was prepared by mixing 135.3 g. sodium aluminate solution (13.74% $Na_2O$, 3.88 $Al_2O_3$, 0.2% $SiO_2$, balance water) with 47.0 g. of sodium hydroxide solution (24.1% NaOH) and 54.0 g. deionized water. This solution was mixed with 175.6 g. of a sodium dissilicate solution analyzing 15.1% $Na_2O$, 0.17% $Al_2O_3$, 29.1% $SiO_2$, balance water. Prior to mixing the solutions were cooled to 59° F.±1° F. The solutions were mixed slowly, whereby the maximum temperature was about 62° F. The resulting solution was aged for 16 hours at room temperature (72°–76° F.) before being used to provide nucleation centers for synthesizing high $SiO_2/Al_2O_3$ in microspheres of calcined clay.

The calcined clay microspheres were prepared by spray drying a slip of high purity Georgia kaolin clay, substantially as described in the Haden et al patents, and calcining the microspheres at about 1800° F. to undergo the kaolin exotherm.

Synthesis of zeolite in the microspheres consisting of calcined clay was as follows: Four-hundred (400) g. of the solution of nucleation centers was placed in a one liter Pyrex resin kettle. The following were added in the order listed, with rapid stirring: 186.2 g. of 24.1% solution of sodium hydroxide, 72.5 g. deionized water and 400 g. calcined microspheres. The slurry was heated to 180° F. for 28 hours while it was stirred at a moderate rate, sufficient to keep the microspheres in suspension. The slurry was filtered under vacuum to remove mother liquor and the filter cake was washed with 2400 ml. deionized water and dried overnight at 110°±5° C. Three batches of crystallized microspheres were obtained by this procedure.

An X-ray diffraction scan of a composite of the batches was obtained over the range 30°–33° $2\theta$ using technique described in the Haden et al patent. The unit cell size of the crystalline component was calculated from measurement of peaks on the X-ray pattern and $SiO_2/Al_2O_3$ was calculated using the formula given by Freeman et al. Zeolite content was estimated from heights of X-ray diffraction peaks. Zeolite content was about 20% and $SiO_2/Al_2O_3$ was 5.36.

We claim:

1. In a process for synthesizing coherent composite zeolitic shaped bodies comprising a mixture of crystalline zeolitic aluminosilicate disseminated throughout the bodies in an essentially amorphous alumina-silica porous residue of anhydrous calcined clay, said process comprising: mixing (a) coherent precursor bodies of essentially the same size and shape as said composite zeolitic bodies and containing kaolin clay calcined under conditions of time and temperature to undergo the characteristic kaolin exotherm with (b) a basic aqueous solution containing a predetermined amount of one or more bases, sufficient of said aqueous solution (b) being present to at least cover said shaped precursor particles (a); heating said mixture of (a) and (b) unit calcined kaolin clay in said precursor bodies (a) is converted by reaction with said basic aqueous solution (b) into shaped bodies containing said mixture of crystalline aluminosilicate and silica-alumina, and a mother liquor containing silica and/or alumina originally in (a) is formed; and recovering the resulting crystallized bodies; the improvement, whereby the rate of growth of said crystalline aluminosilicate in said bodies of calcined clay (a) is desensitized to variations in the source of clay used to produce said bodies (a) and to variations in the calcination conditions used to produce said bodies (a), which comprises: optionally aging, and then heating said mixture of (a) and (b) in the presence of amorphous aluminosilicate nucleation centers.

2. The process of claim 1 wherein said coherent precursor bodies consist essentially of kaolin clay calcined above the characteristic kaolin exotherm.

3. The process of claim 2 said precursor bodies are in the form of fluidizable microspheres and said mixture is in the form of a slurry.

4. The process of claim 2 wherein said basic liquid is an aqueous solution of sodium hydroxide.

5. The process of claim 4 wherein said crystalline zeolitic aluminosilicate is a sodium alumosilicate having the X-ray diffraction pattern of a synthetic faujasite.

6. The process of claim 4 wherein said crystalline zeolitic aluminosilicate in said zeolitic shaped particles is a sodium aluminosilicate having a $SiO_2/Al_2O_3$ above 5 as determined by analysis of the X-ray diffraction pattern using the Freeman et al curve.

7. The process of claim 3 wherein said slurry includes metakaolin.

8. The process of claim 3 wherein said slurry is free from metakaolin.

9. The process of claim 1 wherein said nucleation centers are incorporated into said mixture of (a) and (b) as an ungelled colloidal solution composed of a sodium aluminosilicate.

10. The process of claim 1 wherein said shaped precursor particles (a) are prepared by spray drying an aqueous slip of particles of hydrous kaolin clay to form microspheres and calcining the microspheres at a temperature of at least about 1800° F. for a time such that said hydrous clay is dehydrated and undergoes at least partially the characteristic kaolin exotherm.

11. The process of claim 10 wherein said aqueous solution (b) contains sodium hydroxide and said nucleation centers comprise a dilute colloidal solution of sodium aluminosilicate maintained at a temperature below 100° F.

12. The process of claim 11 wherein said crystallized precursor particles contain at least 15% as determined by X-ray analysis of a crystalline sodium aluminosilicate of the faujasite type, said mother liquor is a solution of sodium silicate, containing silica dissolved from said precursor particles, and the recovered crystallized particles are ion-exchanged with one or more nonalkali metal ions to reduce sodium content to a level such that the ion-exchanged particles are useful as fluid cracking catalyst.

13. The process of claim 1 wherein said nucleation centers are incorporated as a solution into a previously formed slurry of (a) and (b).

14. In a process for producing a fluidizable zeolitic cracking catalyst by (a) spray drying a slurry of hydrated kaolin clay to form fluidizable microspheres; (b) calcining said microspheres under conditions such that kaolin clay undergoes the characteristic kaolin exotherm to produce calcined clay microspheres; (c) mixing said calcined clay microspheres with sodium hydroxide solution to form a slurry, said slurry optionally containing metakaolin; (d) heating such slurry until said calcined clay mircrospheres are converted into a mixture of crystalline zeolite having the X-ray diffraction of synthetic faujasite and an amorphous silica-alumina, silica being extracted into the aqueous phase of said slurry to form a sodium silicate mother liquor: (e) removing at least partially said mother liquor from said crystallized microspheres; (f) ion-exchanging sodium in said crystallized microspheres to reduce the sodium content by replacement of sodium cations with one or more desired nonalkali metal cations; and (g) recovering the ion-exchanged microspheres; the improvement, whereby the rate of growth of said faujasite in said calcined clay microspheres is desensitized to variations in the source of clay used in step (a) and to variations in calcination conditions used in step (b), which comprises: incorporating an amorphous sodium aluminosilicate seed solution maintained at a temperature sufficiently low to prevent gelation into said slurry formed in step (c) and carrying out step (d) without a preliminary conventional aging step.

* * * * *